(12) United States Patent
Lee et al.

(10) Patent No.: US 11,321,557 B2
(45) Date of Patent: May 3, 2022

(54) PRESSURE RECORDING SYSTEMS AND METHODS FOR BIOMETRIC IDENTIFICATION

(71) Applicants: Alex C Lee, Mountain View, CA (US); Hong Chang, Mountain View, CA (US)

(72) Inventors: Alex C Lee, Mountain View, CA (US); Hong Chang, Mountain View, CA (US)

(*) Notice: Subject to any disclaimer, the term of this patent is extended or adjusted under 35 U.S.C. 154(b) by 22 days.

(21) Appl. No.: 16/548,589

(22) Filed: Aug. 22, 2019

(65) Prior Publication Data

US 2020/0082162 A1 Mar. 12, 2020

Related U.S. Application Data

(60) Provisional application No. 62/729,738, filed on Sep. 11, 2018.

(51) Int. Cl.
*G06K 9/00* (2022.01)
*G06K 9/62* (2022.01)
(Continued)

(52) U.S. Cl.
CPC ......... *G06K 9/00335* (2013.01); *G06F 3/044* (2013.01); *G06F 3/04144* (2019.05); *G06K 9/6256* (2013.01)

(58) Field of Classification Search
CPC .. G06K 9/00335; G06K 9/6256; G06F 3/044; G06F 3/04144; G06F 21/32; G01L 5/0038
See application file for complete search history.

(56) References Cited

U.S. PATENT DOCUMENTS 7,356,168 B2 4/2008 Tavares
2011/0050394 A1* 3/2011 Zhang ................... G06F 21/32
340/5.82
(Continued)

FOREIGN PATENT DOCUMENTS

CA 2976049 A1 8/2016
WO 2011072284 A1 6/2011

OTHER PUBLICATIONS

[Online], [Retrieved Nov. 13, 2019]. Retrieved from the Internet <URL:https://www.google.com/search?q=bga+socket&tbm=isch&source=iu&ictx=1&fir=bGxdm2Kt0SSDfM%253A%252C3bl9ghq8UX2q8M%252C_&usg=AFrqEzeCA6efrw3Q4jsxJic7OXoJ_Pne4Q&s>, (16 pgs).
(Continued)

*Primary Examiner* — Bobbak Safaipour
*Assistant Examiner* — Wassim Mahrouka
(74) *Attorney, Agent, or Firm* — North Weber & Baugh LLP; Michael North

(57) ABSTRACT

Described herein are biometric identification systems and methods that use a set of finely spaced analog sensors to generate and record a unique dynamic pressure user profile. The pressure profile is evaluated based on data from a trained model that comprises a number of personal biometric characteristics used to uniquely identify a person, e.g., for authentication purposes, such as granting access to sensitive, confidential information in connection with an electronic commercial transaction, an Internet of Things (IoT) device, an automotive device, an identity and access management (IAM), or a robotic or high functioning touch sensing device.

19 Claims, 5 Drawing Sheets

(51) Int. Cl.
*G06F 3/044* (2006.01)
*G06F 3/041* (2006.01)

(56) References Cited

U.S. PATENT DOCUMENTS

| | | | | |
|---|---|---|---|---|
| 2014/0157911 | A1* | 6/2014 | Sarrafzadeh | A61B 5/1036 73/862.041 |
| 2015/0282766 | A1* | 10/2015 | Cole | A61B 5/1038 702/139 |
| 2016/0239652 | A1* | 8/2016 | Wang | G01L 5/0038 |
| 2017/0010707 | A1* | 1/2017 | Son | H05K 1/0296 |
| 2017/0243359 | A1 | 8/2017 | Bose et al. | |
| 2017/0322674 | A1* | 11/2017 | Rosenberg | G01L 1/205 |
| 2018/0263565 | A1 | 9/2018 | Najafi et al. | |
| 2020/0371633 | A1* | 11/2020 | Afentakis | H03K 17/9647 |
| 2020/0380101 | A1* | 12/2020 | Arii | A61B 5/117 |

OTHER PUBLICATIONS

[Online], [Retrieved Nov. 13, 2019]. Retrieved from the Internet <URL:https7/www.peratech.com/m2436-100148-zf.html>, (5 pgs).

[Online], [Retrieved Nov. 13, 2019]. Retrieved from the Internet <URL:https://en.wikibooks.org/wiki/Robotics/Sensors/Pressure_Sensors> (2 pgs).

[Online], [Retrieved Nov. 13, 2019]. Retrieved from the Internet <URL:http://www.lessemf.com/fabric.html#253> (8 pgs).

[Online], [Retrieved Nov. 13, 2019]. Retrieved from the Internet <URL:http://www.kobakant.at/DIY/?p=213> (9 pgs).

International Search Report and Written Opinion dated Nov. 7, 2019, in International Patent Application No. PCT/US/2019/047769, filed Aug. 22, 2019 (9 pgs).

International Search Report and Written Opinion dated Nov. 19, 2019, in related International Patent Application No. PCT/US19/47770, filed Aug. 22, 2019 (11 pgs).

Final office action dated Jul. 12, 2021 in related U.S. Appl. No. 16/548,611, (18 pgs).

Final office action response filed Oct. 11, 2021 in related U.S. Appl. No. 16/548,611, (7 pgs).

Notice of allowance dated Nov. 10, 2021 in related U.S. Appl. No. 16/548,611, (12 pgs).

Non-Final Office Action dated Apr. 21, 2021 in related U.S. Appl. No. 16/548,644, filed Aug. 22, 2019 (22 pgs).

Non-Final Office Action Response filed Jun. 23, 2021 in related U.S. Appl. No. 16/548,644, filed Aug. 22, 2019 (11 pgs).

* cited by examiner

PRESSURE RECORDING SYSTEMS AND METHODS FOR BIOMETRIC IDENTIFICATION

CROSS REFERENCE TO RELATED PATENT APPLICATIONS

The present application claims priority benefit, under 35 U.S.C. § 119(e), to and commonly-assigned U.S. Patent Application No. 62/729,738, filed on Sep. 11, 2018, entitled "PRESSURE RECORDING SYSTEMS AND METHODS FOR BIOMETRIC IDENTIFICATION," listing as inventors Alex Cheuk Kwong Lee, and Hong Chang, which application is herein incorporated by reference as to its entire content. Each reference mentioned in this patent document is incorporated by reference herein in its entirety.

A. TECHNICAL FIELD

The present disclosure relates generally to systems and methods for personal identification that is based on human-machine interaction. More particularly, the present disclosure relates to biometric systems and methods that record a dynamic pressure profile to uniquely identify and authenticate a user.

B. BACKGROUND

Current biometric methods for personal identification include using fingerprint data, retina scans, facial recognition methods, and the like. All these identification methods have in common that they operate on static biometric data, i.e., the identification data typically does not change over time. One obvious drawback of these static biometric methods for personal identification is that a motivated attacker or identity thief can relatively easily circumvent such methods by copying and then reproducing the identifying data to mimic the original identification data. For example, by presenting to a facial recognition system a color copy of a picture of a to-be-identified person, an imposter may successfully trick a security system into mistakenly recognizing the photo as the to-be-identified person, thus, defeating the security system and gaining access to confidential information.

Accordingly, what is needed are dynamic systems and methods that are virtually impossible to copy and, thus, inherently more secure for safeguarding confidential information.

BRIEF DESCRIPTION OF THE DRAWINGS

References will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments. Items in the figures may be not to scale.

DETAILED DESCRIPTION OF EMBODIMENTS

Figure 1:
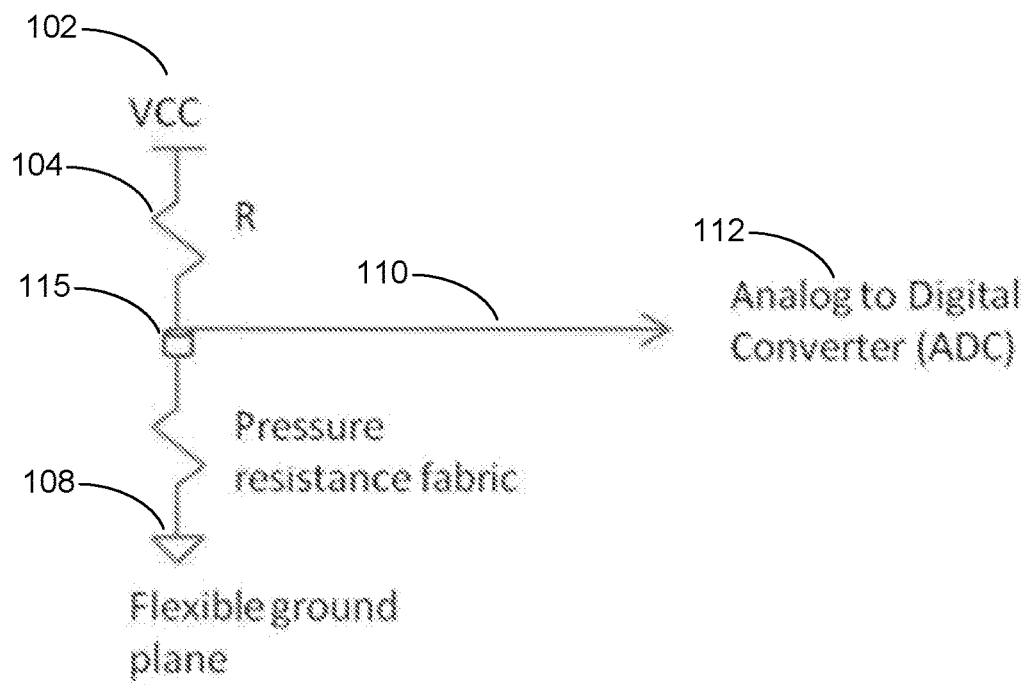
FIG. 1 depicts a simplified schematic of an exemplary sensing circuit for use in a dynamic pressure sensing system according to various embodiments of the present disclosure.

In the following description, for purposes of explanation, specific details are set forth in order to provide an understanding of the invention. It will be apparent, however, to one skilled in the art that the invention can be practiced without these details. Furthermore, one skilled in the art will recognize that embodiments of the present invention, described below, may be implemented in a variety of ways, such as a process, an apparatus, a system, a device, or a method on a tangible computer-readable medium.

Components, or modules, shown in diagrams are illustrative of exemplary embodiments of the invention and are meant to avoid obscuring the invention. It shall also be understood that throughout this discussion components may be described as separate functional units, which may comprise sub-units. Those skilled in the art will recognize that various components, or portions thereof, may be divided into separate components or may be integrated together, including integrated within a single system or component. It should be noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "coupled," "connected," or "communicatively coupled" shall be understood to include direct connections, indirect connections through one or more intermediary devices, and wireless connections.

Reference in the specification to "one embodiment," "preferred embodiment," "an embodiment," or "embodiments" means that a particular feature, structure, characteristic, or function described in connection with the embodiment is included in at least one embodiment of the invention and may be in more than one embodiment. Also, the appearances of the above-noted phrases in various places in the specification are not necessarily all referring to the same embodiment or embodiments.

The use of certain terms in various places in the specification is for illustration and should not be construed as limiting. A service, function, or resource is not limited to a single service, function, or resource; usage of these terms may refer to a grouping of related services, functions, or resources, which may be distributed or aggregated. Furthermore, the use of memory, database, information base, data store, tables, hardware, and the like may be used herein to refer to system component or components into which information may be entered or otherwise recorded.

In this document "sensor array" and "electrical grid" are used interchangeably. Similarly, "pressure" and "force" may be used interchangeably, since as will be recognized by one of skilled in the art, pressure is defined as force applied onto a given surface area. Therefore, the term "pressure data" may refer to data that indicates pressure or a quantity, such as the physical quantity of force, from which pressure may be derived. The terms "pressure sensor" and "pixel" refer to a device for directly or indirectly measuring, at one or more locations, pressure or force, i.e., a quantity from which pressure data may be derived.

FIG. 1 depicts a simplified schematic of an exemplary sensing circuit for use in a dynamic pressure sensing system according to various embodiments of the present disclosure. Sensing circuit 100 comprises power supply 102, resistor 104, electrical contact 115, pressure-sensitive fabric 106, and ground potential 108. Power supply 102 may be a voltage that is provided by an external power source (not shown). Resistor 104 may be a fixed resistance component of the voltage divider in sensing circuit 100. Contact 115 may be an electrode made of conductive material, e.g., a contact pad that, like ground potential 108, and defines a reference voltage.

In embodiments, pressure-sensitive fabric 106 comprises a layer of material that exhibits an electrical resistance that changes when mechanical pressure is exerted by applying a physical force onto the material. In embodiments, pressure-sensitive fabric 106 elastically compresses in response to exertion of a normal force or pressure, thus, causing its resistivity to gradually change. For example, pressure-sensitive fabric 106 may comprise a piezoresistive material that when depressed responds to the change in pressure by decreasing its electrical resistance. Therefore, in operation, pressure-sensitive fabric 106 may be used as a sensing element to perform resistive sensing. The resistance value of pressure-sensitive fabric 106 may vary, e.g., linearly based on the amount of pressure exerted. In embodiments, the resistance may be used to generate an analog voltage 110 that is approximately proportional or inverse proportional to the electrical resistance and proportional to the surface area of pressure-sensitive fabric 106, such that circuit 100 may serve as a pressure sensing element or pressure sensor.

It is understood that voltage 110 may be measured by using any method known in the art. For example, by using an analog to digital converter (ADC) 112 that converts a sensed analog voltage into a digital value that may then be further processed by a signal processing system (not shown in FIG. 1). It is further understood that instead of generating a voltage that represents the sensor data, in embodiments, the function of generating a pressure-related signal may be equally performed by generating resistance data—or any other parameter from which a pressure may be derived—from a current.

In embodiments, a number of sensing circuits 100 may be combined and used together to perform large area resistive sensing by capturing a pressure on a larger area, such as a touch pad surface, e.g., by measuring contact pressure at various points across a predefined surface area.

In embodiments, the amount of pressure applied over a period of time, may be acquired by continuously measuring resistance values to sense temporal variations in pressure. Alternatively, the resistance may be measure at certain fixed or random time intervals from which a temporal pressure profile may be constructed.

It is understood that, sensing circuit 100 may comprise any type of material and additional circuit components having desirable mechanical and electrical properties, e.g., to reduce the effect of unwanted variations caused by environmental parameters on the electrical characteristics of circuit 100, such as variations in temperature, humidity, or component ageing. For example, to enable high-accuracy precision measurements, circuit 100 may comprise compensation circuitry that counteracts possible changes in mechanical and electrical properties to withstand the effects of such unwanted variations and to provide consistent readings without negatively impacting short-term and long-term accuracy. It is further understood that various physical parameters such as clock rate sampling and voltage divider resistances may be adjusted to enhance the pressure recording measurement sensitivity and accuracy.

Figure 2:
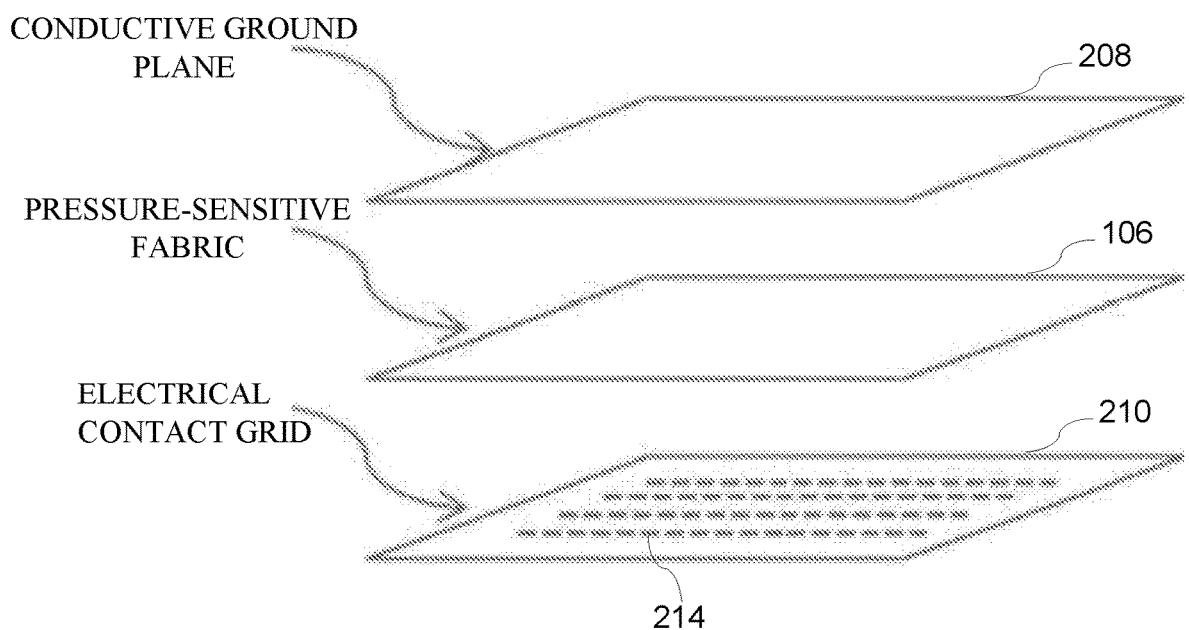
FIG. 2 depicts an illustrative dynamic pressure acquisition system, according to various embodiments of the present disclosure.

FIG. 2 depicts an illustrative dynamic pressure acquisition system, according to various embodiments of the present disclosure. Pressure acquisition system 200 comprises conductive ground plane 208, pressure-sensitive fabric 106, and electrical grid 210. Similar to FIG. 1, pressure-sensitive fabric 106 may be a layer of material that exhibits a variable electrical resistance that gradually varies with the amount of mechanical pressure exerted onto the material.

The pressure acquisition system illustrated in FIG. 2 is not limited to the detail shown there or described in this text. As those skilled in the art will appreciate, a suitable pressure acquisition system may be fabricated by using any suitable pressure-sensitive material or pressure sensor, such as capacitive pressure sensors and by using any topology without converging from the objectives of the present disclosure.

In FIG. 2, conductive ground plane 208 may be implemented as a relatively thin and, thus, flexible sheet of metal that is relatively conductive and covers at the least a predefined pressure sensing area, i.e., some or all of area of pressure-sensitive fabric 106. Pressure-resistive fabric 106 may be positioned between flexible conductive ground plane 208 and each sensor 214 in electrical contact grid 210, such that each sensor 214 is electrically insulated from each other. In embodiments, pressure-sensitive fabric 106 may vary its electrical resistance according to the amount of pressure exerted, such that pressure-sensitive fabric 106 may serve as variable resistor that in a sensing element that generates a measurable output voltage, which varies based on the amount of pressure exerted onto pressure-sensitive fabric 106.

As a result, in embodiments, in response to a user's body part exerting a force on pressure-sensitive fabric 106, based on the number of sensors 214 detecting the resulting pressure, the amount of the pressure each individual sensor 214 registers on a point of a surface, and the spatial distribution of sensors 214, pressure acquisition system 200 may record a unique user-dependent pressure profile. In embodiments, the captured unique profile may then be used as a biometric characteristic to identify the user.

It is understood that the user may generate sensor data by receiving pressure from any part of a user's body, such as a fingertip, that is capable of generating a unique pressure profile that may then be associated with the user to uniquely identify the user as the source of the pressure.

In embodiments, electrical contact grid 210 comprises any number of electrical circuits, e.g., a voltage divider circuit illustrated in FIG. 1, including electrical contact 214, such as an electrical contact pad, an electrical contact bump (e.g., in the shape of a solder ball), or a wire, (e.g., a wire soldered across two holes in a PCB) that may be energized, e.g., by a voltage from a power source. It is noted that while the electrical contacts in contact grid 210 are depicted as being separate from pressure-sensitive fabric 106, it is understood that in embodiments, electrical contacts may be physically embedded directly into pressure sensor fabric 106, for example, to reduce the contact resistance of the electrical contacts.

It is understood that the electrical circuit in contact grid 210 may be implemented as an analog or digital pressure sensor circuit that is configured to measure or derive a pressure value, e.g., depending on the amount of change in resistance and, thus, the amount of pressure exerted at a discrete point (or more correctly across an area) where electrical connectors 214 are located.

In embodiments, electrical contact grid 210 may be disposed on a printed circuit board that, for a given area, comprises N×M electrical connectors 214 that are arranged in the form of a predefined N×M matrix or array having a spatial resolution of N×M "pixels."

In embodiments, sensors 214 may be evenly distributed across a predefined pressure-sensing area of electrical contact grid 210 at a density of, e.g., 256 sensors per square inch or more. However, this is not intended as limitation on the scope of the present disclosure, as the topology of sensors including their electrical connectors 214 may comprise any spacing, density, size (e.g., 1 inch by 1 inch), and pattern (e.g., square or round) that may be advantageous for a particular application. In addition, sensors 214 may be produced using any type of technology known in the art, e.g., micro electro mechanical system (MEMS) technology.

In embodiments, pressure acquisition system 200 may be used to generate a two or three dimensional pressure profile of a user's pressure signature that uniquely identifies the user. This may be accomplished, for example, by defining the area that comprises pressure sensors 214 by a set of pixels or points in electrical contact grid 210. In embodiments, depending on which of the pressure sensor circuits are activated and the amount of pressure their electrical connectors 214 detect, a measured or derived pressure map of electrical resistance values may be plotted. In embodiments, a number of pressure values may be interpolated from the pressure detected and various locations to obtain pressure values, e.g., for imaginary intermediate pixel positions.

In embodiments, pressure acquisition system 200 dynamically measures a two-dimensional pressure profile in real-time to obtain a time-varying, two-dimensional pressure profile. In embodiments, pressure profile acquisition system 200 is configured to measure pressure in more than two directions to emulate a three-dimensional pressure sensor that may be used to generate a dynamic three-dimensional pressure profile.

In embodiments, the spacing of sensors 214 in contact grid 210 is chosen such that subtle biometric details of the exerted pressure, e.g., by a user's finger may be captured. When used in this fashion, pressure acquisition system 200 may have a different number and distribution of sensors 214 than when used for measuring pressure exerted, e.g., by a user's entire hand.

In embodiments, sensors 214 for different body parts may be implemented with different dynamic ranges, e.g., different expected electrical resistance values for different sensors 214. Further, different dynamic ranges of applied pressure may be used within the same contact grid 210, e.g., to adjust for different levels of sensitivity that may be controlled within a given contact grid 210. As an example, sensors 214 may be spaced over a touch pad area with a minimum and maximum density that varies based on the location on contact grid 210 and based on the expected level of pressure exerted at discrete regions of grid 210 such that the sensor density, i.e., the number of sensors 214 per square inch, may vary based on, for example, whether sensor 214 is located in the middle of the touchpad or at the edge.

In embodiments, sensors 214 may capture pressure in the form of an analog sensor voltage signal that may then be output and converted into a digital signal and further processed, e.g., using image processing/pattern recognition software. One of skill in the art will appreciate that a sensor output signal may be generated in the form of a current signal. In embodiments, pressure acquisition system 200 may be used to generate a multi-dimensional pressure profile for the user that can be used to uniquely identify a user.

In embodiments, once pressure acquisition system 200 senses pressure from number of sets of pixels to generate time-varying pressure data captured over a period time, at least some of the measurement results may be associated with a user gesture that may be used as a unique user-generated pressure signature. In embodiments, the time-varying pressure data may be captured in a number of individual frames in which pixels may be grouped into sub-groups or pixel regions that share a common attribute, e.g., a pattern or having been captured at the same time or within a same time window. In embodiments, the temporal spacing between frames in a sequence of recorded frames may be on the order of milliseconds or higher to provide a fine resolution that captures the nuances of the human-machine interaction in real-time.

In embodiments, one or more patterns may be identified in the spatial/time-varying pressure distribution that may be compared, e.g., to a stored pattern that has been obtained in a training phase. Machine training may be applied and periodically updated to train a model with known pressure profiles that have been recognized as valid in identifying a set of persons. In embodiments, based on a comparison between the measured and the stored pattern, a probability value or correlation may be computed that indicates a likelihood that the measured pattern has been generated by the same person as the stored pattern. Or in other words, the likelihood that the stored and measured pressure signatures belong to the same person. In embodiments, once the calculated probability satisfies a threshold, e.g., by falling within a confidence interval, the user may be authenticated.

In embodiments, a time-varying, spatial pressure distribution may be recorded using any signal format to which signal processing may be applied. For example, the recorded sensor readings may be converted from analog to digital, and further analyzed, stored, digitally communicated, and replayed at a later time.

Figure 3:
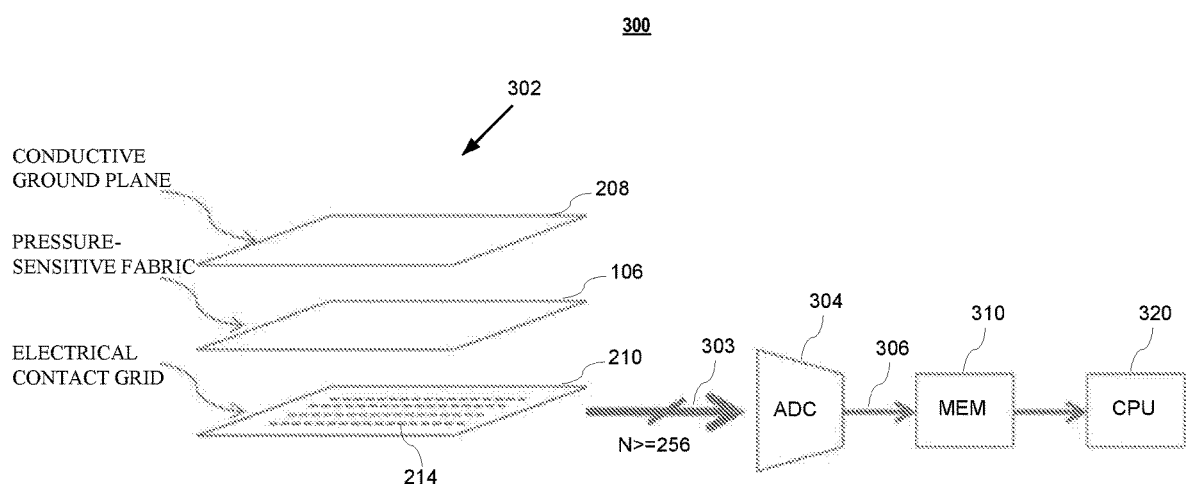
FIG. 3 illustrates an exemplary block diagram of a biometric identification system that records a dynamic pressure profile to authenticate a user, according to various embodiments of the present disclosure.

FIG. 3 illustrates an exemplary block diagram of a biometric identification system that records a dynamic pressure profile to authenticate a user, according to various embodiments of the present disclosure. Biometric identification system 300 comprises pressure acquisition system 302, ADC 304, memory device 310, and CPU 320. For clarity, components similar to those shown in FIG. 2 are labeled in a similar manner. For purposes of brevity, a description or their function is not repeated here.

In embodiments, some or all of identification system 300 may embedded in a device, e.g., a consumer device such as a smartphone, that integrates both hardware and software components. In embodiments, in a manner similar to FIG. 2, pressure acquisition system 302 in FIG. 3 uses pressure-sensitive fabric 106, conductive ground plane 208, and electrical contact grid 210 to measure pressure data over a certain period of time. The measured data may be recorded, e.g., after being further processed by CPU 320, as a two or three-dimensional profile, which may then be used as a biometric characteristic that uniquely identifies a person, e.g., for authentication purposes.

In embodiments, ADC 304, memory device 310, and CPU 320 may be collectively referred to as a recorder that records pressure data from pressure sensors 214 as user-specific time-varying pressure profile. ADC 304 may receive and digitize (e.g., multiplexed) analog signals 303 prior to storing digitized signals 306 in memory device 310 or streaming them, e.g., for further processing. In embodiments, pressure data 303, 306 may be converted into or complemented with any type of other data, such as motion (e.g., velocity, acceleration) data. In embodiments, CPU 320 may be used to analyze digital signals 306 to perform dynamic biometric identification according to various methods disclosed herein. In embodiments, sets of digital pixel data may be processed in certain data structures that store one or more characteristics representative of one or more user postures or gestures within the process of exerting pressure, such as twisting, tilting, curling, or rotating a finger at a certain angle or range of angles, applying more or less pressure at certain regions or segments, etc., causing a unique time-varying spatial pressure distribution profile that then may be discerned and used to correctly identify a person. Upon successful identification a user's personal biometric characteristics may be used in lieu of other means of authorization, such as a password or fingerprint, to gain access to protected confidential information.

In embodiments, CPU 320 may be used to configure individual components of pressure acquisition system 302 to be more sensitive or less sensitive, depending how much pressure a user exerts on a given sensor 214 and the sensor's peak output voltage. CPU 320 may be used to determine one or more data acquisition rates and the frequency of their occurrence, e.g., based on a type of gesture. In embodiments, CPU 320 may be used to compensate for external factors such as environmental variations.

In embodiments, recorded data and any profiles generated therefrom may be time-stamped or otherwise labeled. For example, a frame may have a start time and end time indicating the overall time it took to generate the data in the frame. Labeling may be performed by attaching to the collected data, e.g., a label showing a sampling frequency or acquisition rate (e.g., 100 frames per second), a number of data points per frame (e.g., 256 individual measurement points), and the like. In embodiments, biometric identification system 300 may be configured to capture data in response to a request generated by a user application, for example, once a condition, e.g., a threshold condition such as a minimum pressure level, is satisfied.

Once identification system 300 captures a certain amount of data from pressure acquisition system 302, an interrupt or equivalent message may be sent to CPU 320. Measured and/or recorded pressure profile data may be compared to or evaluated against data obtained from a trained model. As previously mentioned, the personalized, user-dependent model may comprise a pressure profile that comprises a number of unique biometric characteristics that may be used as an identification tool. It is understood that identification system 300 may interface with any number of other devices, for example, via a USB or Bluetooth connection (not shown).

Figure 4:
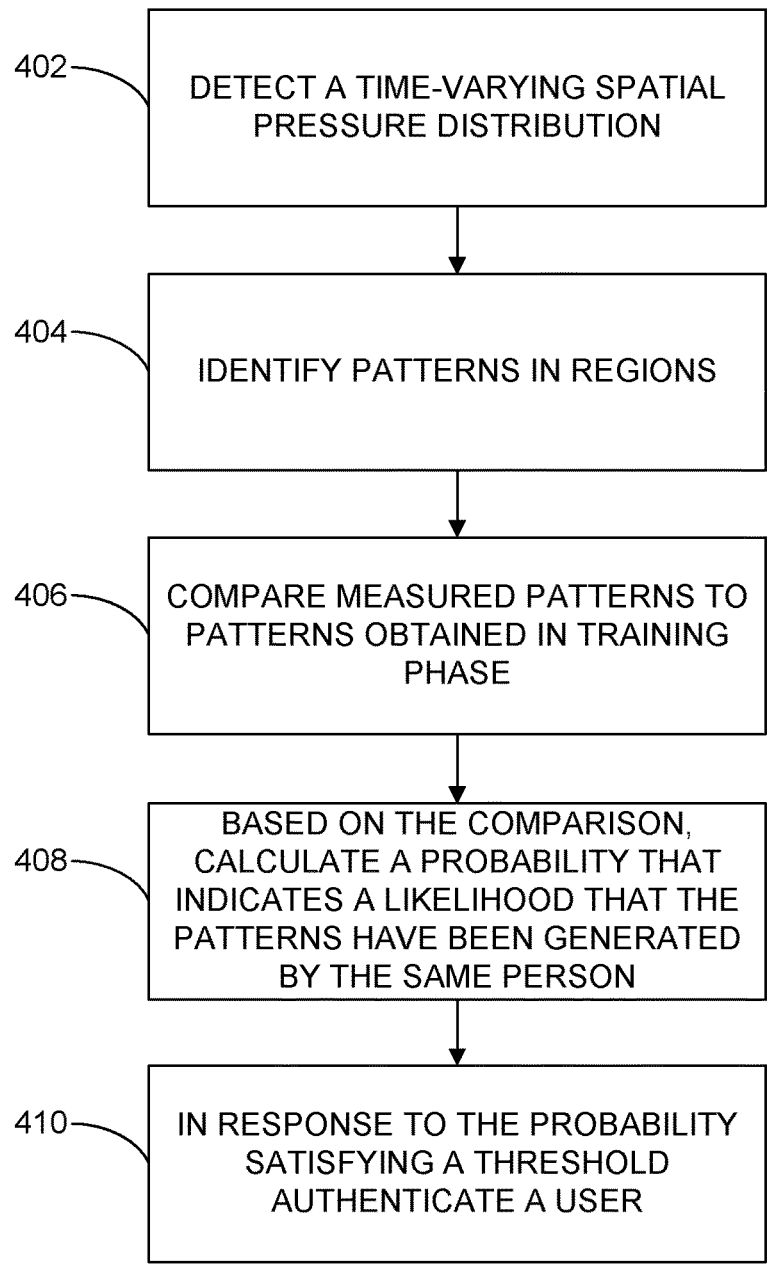
FIG. 4 is a flowchart of an illustrative process for dynamic pressure sensing and recording for authenticating a user in accordance with various embodiments of the present disclosure.

FIG. 4 is a flowchart of an illustrative process for dynamic pressure sensing and recording in accordance with various embodiments of the present disclosure. A process for authenticating a user begins at step 402 by scanning a pressure sensor array to detect a time-varying spatial pressure distribution (or pressure gradient distribution) that has been caused by a user exerting pressure on a surface area.

At step 404, a number of patterns may be identified in regions within the surface area.

At step 406, the identified patterns may be compared to stored patterns that have been obtained in a training phase.

At step 408, based on the comparison, a probability may be calculated that indicates a likelihood that measured pattern has been generated by the same person as the stored pattern.

Finally, at step 410, in response to the probability satisfying a threshold, e.g., by falling within a confidence interval, the user may be authenticated. It is noted that: (1) certain steps may optionally be performed; (2) steps may not be limited to the specific order set forth herein; (3) certain steps may be performed in different orders; and (4) certain steps may be done concurrently.

Figure 5:
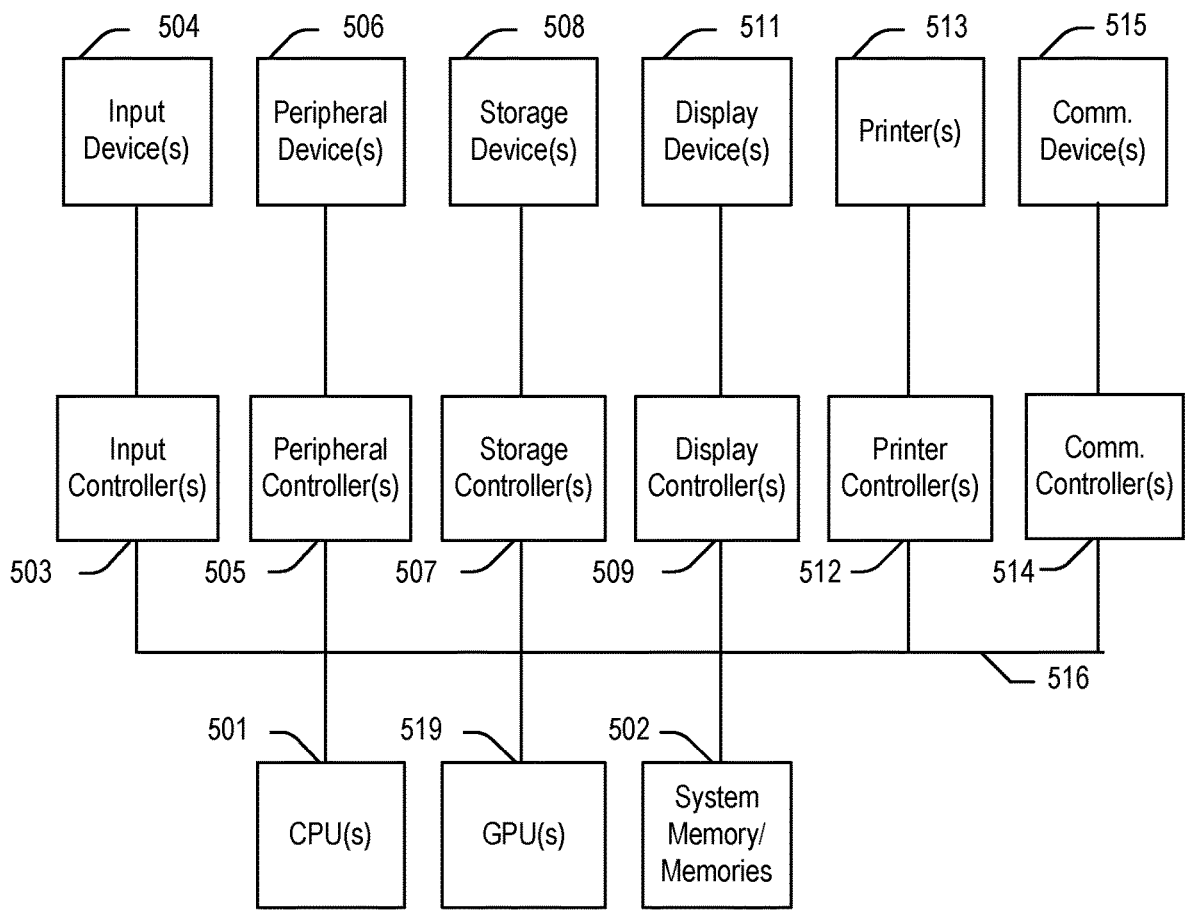
FIG. 5 depicts a simplified block diagram of a computing device/information handling system, in accordance with embodiments of the present disclosure.

FIG. 5 depicts a simplified block diagram of a computing device/information handling system (or computing system) according to embodiments of the present disclosure. It will be understood that the functionalities shown for system 500 may operate to support various embodiments of a computing system—although it shall be understood that a computing system may be differently configured and include different components, including having fewer or more components as depicted in FIG. 5.

As illustrated in FIG. 5, the computing system 500 includes one or more central processing units (CPU) 501 that provides computing resources and controls the computer. CPU 501 may be implemented with a microprocessor or the like, and may also include one or more graphics processing units (GPU) 519 and/or a floating-point coprocessor for mathematical computations. System 500 may also include a system memory 502, which may be in the form of random-access memory (RAM), read-only memory (ROM), or both.

A number of controllers and peripheral devices may also be provided, as shown in FIG. 5. An input controller 503 represents an interface to various input device(s) 504. The computing system 500 may also include a storage controller 507 for interfacing with one or more storage devices 508 that might be used to record programs of instructions for operating systems, utilities, and applications, which may include embodiments of programs that implement various aspects of the present invention. Storage device(s) 508 may also be used to store processed data or data to be processed in accordance with the invention. The system 500 may also include a display controller 509 for providing an interface to a display device 511, which may be a cathode ray tube (CRT), a thin film transistor (TFT) display, organic light-emitting diode, electroluminescent panel, plasma panel, or other type of display. The computing system 500 may also include one or more peripheral controllers or interfaces 505 for one or more peripherals. Example of peripheral may include one or more printers, scanners, input devices, output devices, sensors, and the like. A communications controller 514 may interface with one or more communication devices 515, which enables the system 500 to connect to remote devices through any of a variety of networks including the Internet, a cloud resource (e.g., an Ethernet cloud, a Fiber Channel over Ethernet (FCoE)/Data Center Bridging (DCB) cloud, etc.), a local area network (LAN), a wide area network (WAN), a storage area network (SAN) or through any suitable electromagnetic carrier signals including infrared signals.

In the illustrated system, all major system components may connect to a bus 516, which may represent more than one physical bus. However, various system components may or may not be in physical proximity to one another. For example, input data and/or output data may be remotely transmitted from one physical location to another. In addition, programs that implement various aspects of the invention may be accessed from a remote location (e.g., a server) over a network. Such data and/or programs may be conveyed through any of a variety of machine-readable media.

Aspects of the present invention may be encoded upon one or more non-transitory computer-readable media with instructions for one or more processors or processing units to cause steps to be performed. It shall be noted that the one or more non-transitory computer-readable media shall include volatile and non-volatile memory. It shall be noted that alternative implementations are possible, including a hardware implementation or a software/hardware implementation. Hardware-implemented functions may be realized using application specific integrated circuits (ASICs), programmable arrays, digital signal processing circuitry, or the like. Accordingly, the terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that embodiments of the present invention may further relate to computer products with a non-transitory, tangible computer-readable medium that have computer code thereon for performing various computer-implemented operations. The media and computer code may be those specially designed and constructed for the purposes of the present invention, or they may be of the kind known or available to those having skill in the relevant arts. Examples of tangible computer-readable media include, but are not limited to: magnetic media such as hard disks; optical media such as CD-ROMs and holographic devices; magneto-optical media; and hardware devices that are specially configured to store or to store and execute program code, such as ASICs, programmable logic devices (PLDs), flash memory devices, and ROM and RAM devices. Examples of computer code include machine code, such as produced by a compiler, and files containing higher level code that are executed by a computer using an interpreter. Embodiments of the present invention may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize no computing system or programming language is critical to the practice of the present invention. One skilled in the art will also recognize that a number of the elements described above may be physically and/or functionally separated into sub-modules or combined together.

It will be appreciated to those skilled in the art that the preceding examples and embodiments are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of any claims may be arranged differently including having multiple dependencies, configurations, and combinations.

What is claimed is:

1. A pressure recording method comprising:
    sensing a first pressure profile based on a user applying pressure to a pressure acquisition system, the pressure acquisition system comprising a pressure-resistive fabric positioned between a flexible conductive ground plane and an electrical contact grid, the electrical contract grid comprising a plurality of electrically isolated pressure sensors, each pressure sensor within the plurality of pressure sensors being electrically insulated from each other, the plurality of pressure sensors having a first subset of sensors operable at a first sensitivity and a second subset of sensors operable at a second sensitivity that is different from the first sensitivity;
    storing a first pressure profile associated with a user, the first pressure profile having been validated and associated with the user;
    in response to an occurrence of the user exerting pressure on a surface area coupled to a set of pressure sensors, receiving pressure sensor data;
    using the pressure sensor data to generate a time-varying spatial pressure distribution that defines the occurrence;
    recording the time-varying spatial pressure distribution that defines the occurrence;
    using at least some of the time-varying spatial pressure distribution to generate a second pressure profile;
    updating a model using the second pressure profile, the model having been previously trained using the first pressure profile; and
    using the updated model to identify the user.

2. The method according to claim 1, further comprising identifying one or more patterns in the model to authenticate or identify the user in connection with at least one of an electronic commercial transaction, an Internet of Things (IoT) device, an automotive device, an identity and access management (IAM), or a robotic or high functioning touch sensing device.

3. The method according to claim 1, further comprising associating the second pressure profile with a user gesture.

4. The method according to claim 1, further comprising comparing the one or more patterns within the updated model to patterns that have been obtained in a training phase to obtain a comparison result.

5. The method according to claim 4, further comprising, based on the comparison result, calculating a likelihood that the one or more patterns are associated with the user.

6. The method according to claim 1, wherein the time-varying spatial pressure distribution emulates a multi-dimensional pressure sensor.

7. The method according to claim 1, wherein the time-varying spatial pressure distribution is measured in real-time.

8. A pressure sensing system for authenticating a user, the pressure sensing system comprising:
    a storage device that stores a plurality of pressure patterns of a user, the plurality of pressure patterns being periodically generated over time, the plurality of pressure patterns having been validated and associated with the user;
    one or more processors coupled to receive the plurality of pressure patterns and generate a model used to authenticate the user based on pressure sensor readings subsequent to the model being generated;

a pressure acquisition system comprising a pressure-resistive fabric positioned between a flexible conductive ground plane and an electrical contact grid, the electrical contract grid comprising a plurality of electrically isolated pressure sensors, each pressure sensor within the plurality of pressure sensors being electrically insulated from each other, the plurality of pressure sensors having a first subset of sensors operable at a first sensitivity and a second subset of sensors operable at a second sensitivity that is different from the first sensitivity;

a set of pressure sensors within the plurality of sensors that, in response to a new occurrence of the user exerting pressure on a surface area coupled to the set of pressure sensors, outputs pressure sensor data; and the one or more processors that, in response to receiving the pressure sensor data, generate a time-varying spatial pressure distribution, which defines the occurrence, to generate a new pressure profile that identifies the user, and wherein the one or more processors uses the new pressure profile to update the model used to authenticate the user.

9. The pressure sensing system according to claim 8, wherein the one or more processors cause the time-varying spatial pressure distribution to be recorded as a time-varying pressure profile.

10. The pressure sensing system according to claim 8, wherein the one or more processors use one or more patterns in the pressure profile as a biometric identifier to authenticate the user.

11. The pressure sensing system according to claim 8, wherein some or all of the set of pressure sensors comprise a fabric that has an electrical resistance that varies depending on an amount of force exerted on the fabric.

12. The pressure sensing system according to claim 11, wherein the fabric comprises a piezoresistive material.

13. The pressure sensing system according to claim 8, wherein some or all of the set of pressure sensors are arranged in an N×M sensor matrix.

14. The pressure sensing system according to claim 8, wherein some or all of the set of pressure sensors are spatially distributed in a predetermined pattern.

15. The pressure sensing system according to claim 8, wherein the set of pressure sensors comprises capacitive pressure sensors.

16. The pressure sensing system according to claim 8, wherein some or all of the set of pressure sensors comprises an electrical contact that defines a voltage divider circuit.

17. The pressure sensing system according to claim 8, wherein some or all of the set of pressure sensors are arranged in regions of differing spatial density.

18. The pressure sensing system according to claim 17, wherein the regions of differing spatial density are arranged based on an expected level of pressure.

19. The pressure sensing system according to claim 8, wherein the one or more processors convert at least some of the pressure sensor data to motion data.

* * * * *